United States Patent
Kaneko et al.

(10) Patent No.: US 9,976,106 B2
(45) Date of Patent: May 22, 2018

(54) REFRIGERATOR OIL COMPOSITION AND REFRIGERATOR SYSTEM

(71) Applicants: IDEMITSU KOSAN CO., LTD., Chiyoda-ku (JP); DENSO CORPORATION, Kariya-shi (JP); KABUSHIKI KAISHA TOYOTA JIDOSHOKKI, Kariya-shi (JP)

(72) Inventors: Masato Kaneko, Ichihara (JP); Masataka Muto, Kariya (JP); Masami Sanuki, Kariya (JP); Takahiro Hoshida, Kariya (JP)

(73) Assignees: IDEMITSU KOSAN CO., LTD., Chiyoda-ku (JP); DENSO CORPORATION, Kariya-shi (JP); KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 128 days.

(21) Appl. No.: 14/776,173

(22) PCT Filed: Mar. 14, 2014

(86) PCT No.: PCT/JP2014/056938
§ 371 (c)(1),
(2) Date: Sep. 14, 2015

(87) PCT Pub. No.: WO2014/142313
PCT Pub. Date: Sep. 18, 2014

(65) Prior Publication Data
US 2016/0040094 A1 Feb. 11, 2016

(30) Foreign Application Priority Data

Mar. 15, 2013 (JP) .................... 2013-054262

(51) Int. Cl.
*C10M 169/04* (2006.01)
*C10M 171/00* (2006.01)
*C09K 5/04* (2006.01)
*F25B 9/00* (2006.01)

(52) U.S. Cl.
CPC ......... *C10M 169/04* (2013.01); *C09K 5/041* (2013.01); *C10M 171/008* (2013.01); *C10M 2207/2835* (2013.01); *C10M 2209/043* (2013.01); *C10M 2209/1045* (2013.01); *C10M 2209/1055* (2013.01); *C10M 2209/1075* (2013.01); *C10M 2209/1085* (2013.01); *C10N 2220/022* (2013.01); *C10N 2220/302* (2013.01); *C10N 2220/306* (2013.01); *C10N 2230/02* (2013.01); *C10N 2240/30* (2013.01); *F25B 9/008* (2013.01)

(58) Field of Classification Search
None
See application file for complete search history.

(56) References Cited

U.S. PATENT DOCUMENTS

| | | |
|---|---|---|
| 2010/0147016 A1 | 6/2010 | Kaneko et al. |
| 2011/0049414 A1 | 3/2011 | Kaneko et al. |
| 2011/0240910 A1* | 10/2011 | Carr .................. C10M 171/008 252/68 |
| 2013/0012419 A1 | 1/2013 | Matsumoto |
| 2013/0119299 A1 | 5/2013 | Low |
| 2013/0207024 A1 | 8/2013 | Takigawa et al. |
| 2015/0041704 A1 | 2/2015 | Saito et al. |

FOREIGN PATENT DOCUMENTS

| | | |
|---|---|---|
| EP | 2 551 333 A1 | 1/2013 |
| EP | 2 832 836 A1 | 2/2015 |
| GB | 2480517 A | 11/2011 |
| JP | 07-507342 A | 8/1995 |
| JP | 2000-212584 A | 8/2000 |
| JP | 2006-503961 A | 2/2006 |
| JP | 2008-115266 A | 5/2008 |
| JP | 2009-79147 A | 4/2009 |
| JP | 2009-191212 A | 8/2009 |
| JP | 2011-256361 A | 12/2011 |
| WO | WO 2008/130039 A1 | 10/2008 |
| WO | WO 2011/144909 A2 | 11/2011 |
| WO | WO 2012/026303 A1 | 3/2012 |
| WO | WO 2013/005645 A1 | 1/2013 |

OTHER PUBLICATIONS

Extended European Search Report dated Dec. 2, 2016 in Patent Application No. 14765555.9
International Search Report dated Jun. 17, 2014, in PCT/JP2014/056938 filed Mar. 14, 2014.

* cited by examiner

*Primary Examiner* — Necholus Ogden, Jr.
(74) *Attorney, Agent, or Firm* — Oblon, McClelland, Maier & Neustadt, L.L.P.

(57) ABSTRACT

Provided is a refrigerating machine oil composition, which is to be used for a refrigerant including a mixture of an unsaturated fluorinated hydrocarbon compound, a saturated fluorinated hydrocarbon compound and $CO_2$, contains a base oil which includes at least one selected from a polyoxyalkylene glycol, a polyvinyl ether, a copolymer of a poly(oxy)alkylene glycol or a monoether thereof and a polyvinyl ether, and a polyol ester and has a kinematic viscosity at 100° C. of 2 $mm^2/s$ or more and 50 $mm^2/s$ or less and a hydroxyl value of 5 mgKOH/g or less, is able to be used for a refrigerating machine system using a refrigerant having a low global warming potential and usable especially for a car air conditioner or the like and including a mixture of an unsaturated fluorinated hydrocarbon compound, a saturated fluorinated hydrocarbon compound and $CO_2$, and exhibits not only excellent compatibility with the refrigerant but also excellent stability.

18 Claims, No Drawings

REFRIGERATOR OIL COMPOSITION AND REFRIGERATOR SYSTEM

TECHNICAL FIELD

The present invention relates to a refrigerating machine oil composition, and in more detail, the present invention relates to a refrigerating machine oil composition to be used in a refrigerating machine system using a refrigerant having a low global warming potential and being usable especially for a current car air conditioner system or the like, and to a refrigerating machine system.

BACKGROUND ART

A chlorofluorocarbon (CFC), a hydrochlorofluorocarbon (HCFC), and the like have hitherto been used as a refrigerant for refrigerating machines. However, such compounds were a compound containing chlorine that is responsible for environmental issues, and hence, investigation has been conducted on a chlorine-free alternative refrigerant, such as a hydrofluorocarbon (HFC), etc. As such a hydrofluorocarbon, compounds represented by, for example, 1,1,1,2-tetrafluoroethane, difluoromethane, pentafluoroethane, and 1,1,1-trifluoroethane (hereinafter referred to as R134a, R32, R125, and R143a, respectively), have been attracting attention, and for example, R134a has been chiefly used in a car air conditioner system. However, even in this HFC, there is a concern about influences from the standpoint of global warming. For example, R134a has a high global warming potential (GWP), and hence, an alternative refrigerant which is suitable for the environmental protection has further been demanded.

As a refrigerant which has a low global warming potential and can be used in a current car air conditioner system or the like, there have been proposed refrigerants having a specified polar structure in a molecule thereof and the like, for example, an unsaturated fluorinated hydrocarbon compound (see, for example, PTL 1), a fluorinated ether compound (see, for example, PTL 2), a fluorinated alcohol compound, a fluorinated ketone compound, etc., and the like. Furthermore, a composition including trans-1,3,3,3-tetrafluoropropene (R1234ze), carbon dioxide, and a third component selected from R32, 1,1-difluoroethane (R152a), fluoroethane (R161), R134a, propylene, propane, and a mixture thereof (see, for example, PTL 3) has been found out.

CITATION LIST

Patent Literature

PTL 1: JP 2006-503961 A
PTL 2: JP 07-507342 A
PTL 3: JP 2011-256361 A

SUMMARY OF INVENTION

Technical Problem

Meanwhile, in a compression type refrigerating machine, usually, the inside of a compressor becomes high-temperature, whereas the inside of a condenser becomes low-temperature, and hence, a refrigerant and a refrigerating machine oil are required to circulate within this system in the wide temperature range of from low temperatures to high temperatures without causing phase separation. However, in general, in the case of using a carbon dioxide refrigerant in a car air conditioner system or the like, it was known that the carbon dioxide refrigerant involves a problem in compatibility with the refrigerating machine oil. In addition, with respect to the refrigerant described in the aforementioned PTL 3 using a carbon dioxide refrigerant, for example, in the case of using it in a car air conditioner or the like, there was involved a problem in compatibility with the refrigerating machine oil, and the stability of the refrigerating machine oil was not satisfactory, too.

In consequence, in the refrigerating machine system, not only a refrigerant suited for the environmental protection such as one having a low global warming potential (GWP) but also a refrigerating machine oil composition having excellent compatibility with the refrigerant and having excellent stability has been demanded.

An object of the present invention is to provide a refrigerating machine oil composition which can be used for a refrigerating machine system using a refrigerant including a mixture of an unsaturated fluorinated hydrocarbon compound, a saturated fluorinated hydrocarbon compound, and $CO_2$, the refrigerant having a low global warming potential and usable especially for a car air conditioner or the like, has excellent compatibility with the refrigerant, and also satisfies various performances of a refrigerating machine oil, such as excellent stability, etc., and a refrigerating machine system using the same.

Solution to Problem

In order to achieve the aforementioned object, the present inventors made extensive and intensive investigations. As a result, it has been found that the object can be achieved by using, as the refrigerant, a refrigerant including a mixture of an unsaturated fluorinated hydrocarbon compound, a saturated fluorinated hydrocarbon compound, and $CO_2$ and using, as the refrigerating machine oil, a base oil including a specified oxygen-containing compound having specified properties. The present invention has been accomplished on the basis of such finding.

Specifically, the present invention provides the following.
(1) A refrigerating machine oil composition to be used in a refrigerant including a mixture of an unsaturated fluorinated hydrocarbon compound, a saturated fluorinated hydrocarbon compound, and $CO_2$, the refrigerating machine oil composition containing a base oil which includes at least one selected from a polyoxyalkylene glycol, a polyvinyl ether, a copolymer of a poly(oxy)alkylene glycol or a monoether thereof and a polyvinyl ether, and a polyol ester and which has a kinematic viscosity at 100° C. of 2 to 50 mm²/s and a hydroxyl value of 5 mgKOH/g or less.
(2) The refrigerating machine oil composition as set forth in the above item (1), wherein the kinematic viscosity at 100° C. of the base oil is 5 mm²/s or more and 30 mm²/s or less, and a moisture content in the composition is 700 ppm or less.
(3) The refrigerating machine oil composition as set forth in the above item (1) or (2), wherein the polyoxyalkylene glycol is represented by the general formula (I):

$$R^1-[(OR^2)_m-OR^3]_n \qquad (I)$$

(in the formula, $R^1$ represents a hydrogen atom, an alkyl group having 1 to 10 carbon atoms, an acyl group having 2 to 10 carbon atoms, or an aliphatic hydrocarbon group having 1 to 10 carbon atoms and having 2 to 6 bonding sites; $R^2$ represents an alkylene group having 2 to 4 carbon atoms; $R^3$ represents a hydrogen atom, an alkyl group having 1 to 10 carbon atoms, or an acyl group having 2 to 10 carbon atoms; n represents an integer of 1 to 6; and m represents such a number that an average value for m×n is from 6 to 80).

(4) The refrigerating machine oil composition as set forth in the above item (1) or (2), wherein the polyvinyl ether is represented by the general formula (II):

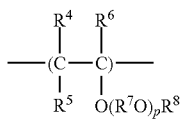

(in the formula, $R^4$, $R^5$, and $R^6$ each represent a hydrogen atom or a hydrocarbon group having 1 to 8 carbon atoms and may be identical to or different from each other; $R^7$ represents a divalent hydrocarbon group having 2 to 10 carbon atoms; $R^8$ represents a hydrocarbon group having 1 to 10 carbon atoms; p represents such a number that an average value thereof is from 0 to 10; and when a plurality of $R^7O$'s are present, a plurality of $R^7O$'s may be identical to or different from each other).

(5) The refrigerating machine oil composition as set forth in the above item (1) or (2), wherein the copolymer of a poly(oxy)alkylene glycol or a monoether thereof and a polyvinyl ether is represented by the general formula (VIII) or (IX):

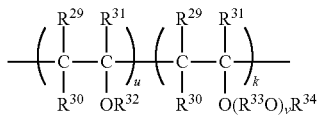

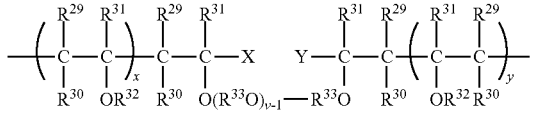

(in the formulae, $R^{29}$, $R^{30}$, and $R^{31}$ each represent a hydrogen atom or a hydrocarbon group having 1 to 8 carbon atoms and may be identical to or different from each other; $R^{33}$ represents a divalent hydrocarbon group having 2 to 4 carbon atoms; $R^{34}$ represents an aliphatic or alicyclic hydrocarbon group having 1 to 20 carbon atoms, an aromatic group optionally having substituent having 1 to 20 carbon atoms, an acyl group having 2 to 20 carbon atoms, or an oxygen-containing hydrocarbon group having 2 to 50 carbon atoms; $R^{32}$ represents a hydrocarbon group having 1 to 10 carbon atoms; when a plurality of each of $R^{32}$'s, $R^{33}$'s, and $R^{34}$'s are present, a plurality of each of $R^{32}$'s, $R^{33}$'s, and $R^{34}$'s may be identical to or different from each other; v represents such a number that an average value thereof falls within the range of from 1 to 50; when a plurality of $R^{33}O$'s are present, a plurality of $R^{33}O$'s may be identical to or different from each other; k represents a number of from 1 to 50; u represents a number of from 0 to 50; when a plurality of each of k's and u's are present, each of the polymers may be a block polymer or a random polymer; x and y each represent a number of from 1 to 50; when a plurality of each of x's and y's are present, each of the polymers may be a block polymer or a random polymer; and X and Y each represent a hydrogen atom, a hydroxyl group, or a hydrocarbon group having 1 to 20 carbon atoms).

(6) The refrigerating machine oil composition as set forth in the above item (1) or (2), wherein the polyol ester is an ester of a diol or a polyol having 3 to 20 hydroxyl groups and a fatty acid having 1 to 24 carbon atoms.

(7) The refrigerating machine oil composition as set forth in any one of the above items (1) to (6), wherein at least one selected from an antioxidant, an extreme pressure agent, an acid scavenger, an oxygen scavenger, a copper inactivator, an anticorrosive, and an antifoaming agent is blended in the base oil.

(8) The refrigerating machine oil composition as set forth in any one of the above items (1) to (7), wherein a global warming potential (GWP) of the refrigerant is 150 or less.

(9) The refrigerating machine oil composition as set forth in any one of the above items (1) to (8), wherein the refrigerant is a mixture of trans-1,3,3,3-tetrafluoropropene (R1234ze), 1,1,1,2-tetrafluoroethane (R134a), and $CO_2$.

(10) The refrigerating machine oil composition as set forth in any one of the above items (1) to (9), wherein a moisture content of the composition is 300 mass ppm or less.

(11) A refrigerating machine system using the refrigerating machine oil composition as set forth in any one of the above items (1) to (10) and a refrigerant including a mixture of an unsaturated fluorinated hydrocarbon compound, a saturated fluorinated hydrocarbon compound, and $CO_2$, a moisture content within the refrigerating machine system being 500 mass ppm or less.

(12) The refrigerating machine system as set forth in the above item (11), which is used in a car air conditioner, GHP, an air conditioner, a cold storage, a vending machine, a showcase, a hot water supply system, or a floor heating system.

Advantageous Effects of Invention

According to the present invention, it is possible to provide a refrigerating machine oil composition which can be used for a refrigerating machine system using a refrigerant having a low global warming potential and usable especially for a car air conditioner or the like, the refrigerant including a mixture of an unsaturated fluorinated hydrocarbon compound, a saturated fluorinated hydrocarbon compound, and $CO_2$, has excellent compatibility with the refrigerant, and also satisfies various performances of a refrigerating machine oil, such as excellent stability, etc., and a refrigerating machine system using the same.

DESCRIPTION OF EMBODIMENTS

The present invention is hereunder described in more detail.

The refrigerating machine oil composition of the present invention is a refrigerating machine oil composition to be used in a refrigerant including a mixture of an unsaturated fluorinated hydrocarbon compound, a saturated fluorinated hydrocarbon compound, and $CO_2$, the refrigerating machine oil composition containing a base oil which includes at least one selected from a polyoxyalkylene glycol, a polyvinyl ether, a copolymer of a poly(oxy)alkylene glycol or a monoether thereof and a polyvinyl ether, and a polyol ester and which has a kinematic viscosity at 100° C. of 2 $mm^2/s$ or more and 50 $mm^2/s$ or less and a hydroxyl value of 5 mgKOH/g or less.

<Refrigerant>

The refrigerant of a refrigerating machine using the refrigerating machine oil composition of the present invention includes a mixture of an unsaturated fluorinated hydrocarbon compound, a saturated fluorinated hydrocarbon compound, and $CO_2$.

(Unsaturated Fluorinated Hydrocarbon Compound)

In the present invention, preferred examples of the unsaturated fluorinated hydrocarbon compound constituting the mixture to be used as the refrigerant may include fluorinated compounds of a linear or branched chain olefin having 2 to 6 carbon atoms or a cyclic olefin having 4 to 6 carbon atoms.

Specific examples thereof include ethylenes having 1 to 3 fluorine atoms introduced thereinto, propenes having 1 to 5 fluorine atoms introduced thereinto, butenes having 1 to 7 fluorine atoms introduced thereinto, pentenes having 1 to 9 fluorine atoms introduced thereinto, hexenes having 1 to 11 fluorine atoms introduced thereinto, cyclobutenes having 1 to 5 fluorine atoms introduced thereinto, cyclopentenes having 1 to 7 fluorine atoms introduced thereinto, cyclohexenes having 1 to 9 fluorine atoms introduced thereinto, and the like.

Of those unsaturated fluorinated hydrocarbon compounds, a fluorinated compound of propene is preferred, and from the viewpoint of environmental performances, such as GWP, etc., for example, various isomers of pentafluoropropene, 3,3,3-trifluoropropene, 1,3,3,3-tetrafluoropropene (R1234ze), and the like are suitable.

In the present invention, one kind of the unsaturated fluorinated hydrocarbon compounds may be used alone, or two or more kinds thereof may be used in combination.

In view of the fact that the unsaturated fluorinated hydrocarbon compound is a refrigerant having a low GWP, it is blended in an amount of typically 45 mass % or more, preferably 45 mass % or more and 96 mass % or less, more preferably 75 mass % or more and 96 mass % or less, still more preferably 79 mass % or more and 96 mass % or less, and especially preferably 82 mass % or more and 90 mass % or less based on the total amount of the refrigerant from the viewpoints of environmental performances, stability, and the like.

(Saturated Fluorinated Hydrocarbon Compound)

The saturated fluorinated hydrocarbon compound constituting the mixture to be used as the refrigerant is preferably a fluorinated compound of an alkane having 2 to 4 carbon atoms. In particular, 1,1-difluoroethane (R152a), 1,1,1-trifluoroethane, 1,1,2-trifluoroethane, 1,1,1,2-tetrafluoroethane (R134a), 1,1,2,2-tetrafluoroethane, and 1,1,1,2,2-pentafluoroethane, all of which are a fluorinated compound of ethane, as well as fluoroethane (R161) and difluoromethane (R32) are useful, and R134a (also called HFC134a) is especially suitable from the viewpoints of stability and saturated vapor pressure properties. One kind of the saturated fluorinated hydrocarbon compounds may be used alone, or two or more kinds thereof may be used in combination.

In addition, a blending amount of the saturated fluorinated hydrocarbon compound is typically 2 mass % or more and 50 mass % or less, preferably 2 mass % or more and 40 mass % or less, more preferably 2 mass % or more and 30 mass % or less, still more preferably 2 mass % or more and 20 mass % or less, yet still more preferably 2 mass % or more and 15 mass % or less, and especially preferably 6 mass % or more and 15 mass % or less based on the total amount of the refrigerant from the viewpoints of environmental performances, such as GWP, etc., and stability.

($CO_2$ Refrigerant)

In the mixture to be used as the refrigerant of the refrigerating machine using the refrigerating machine oil composition of the present invention, $CO_2$ is blended as the refrigerant having a low global warming potential and suited for the environmental protection. $CO_2$ as the refrigerant usually requires a high pressure, and hence, its use amount is generally restricted in the refrigerating system, such as a car air conditioner, etc. In addition, taking into consideration the compatibility with the refrigerating machine oil composition, or the like, in the present invention, $CO_2$ is blended in an amount of typically 12 mass % or less, preferably 1 mass % or more and 10 mass % or less, and more preferably 2 mass % or more and 7 mass % or less in the refrigerant based on the total amount of the refrigerant.

(Refrigerant Including a Mixture of an Unsaturated Fluorinated Hydrocarbon Compound, a Saturated Fluorinated Hydrocarbon Compound, and $CO_2$)

The refrigerant of the refrigerating machine using the refrigerating machine oil composition of the present invention includes a mixture of the unsaturated fluorinated hydrocarbon compound, the saturated fluorinated hydrocarbon compound, and the $CO_2$.

The refrigerant in the present invention preferably includes a mixture of R1234ze (also called HFO1234ze), $CO_2$, and a refrigerant selected from R134a (also called HFC134a), R32, R152a, R161, and the like, and more preferably includes a mixture of R1234ze (HFO1234ze), $CO_2$, and R134a (HFC134a) from the viewpoints of environmental performances, stability, and the like. Still more preferably, the refrigerant in the present invention preferably includes a mixture of 79 mass % or more and 96 mass % or less of R1234ze (HFO1234ze), 2 mass % or more and 7 mass % or less of $CO_2$, and 2 mass % or more and 15 mass % or less of R134a (HFC134a).

In the refrigerant in the present invention, the refrigerant including the aforementioned mixture may be further combined with other refrigerant and used within the range where the effects of the present invention are not impaired. Specifically, as such other refrigerant, any one of refrigerants described in JP 2011-256361 A may be used, and, for example, propylene, propane, and the like may be used.

The refrigerant in the present invention has a GWP of 1,300 or less, preferably 1,000 or less, and more preferably 800 or less, 500 or less, 400 or less, 300 or less, or 200 or less. In particular, the refrigerant in the present invention has a GWP of preferably 150 or less or 100 or less, and more preferably 50 or less.

<Refrigerating Machine Oil Composition>

The refrigerating machine oil composition of the present invention is a lubricating oil composition for refrigerating machine systems using the aforementioned refrigerant and contains, as the base oil, a base oil including at least one selected from a polyoxyalkylene glycol (PAG), a polyvinyl ether (PVE), a copolymer (ECP) of a poly(oxy)alkylene glycol or a monoether thereof and a polyvinyl ether, and a polyol ester (POE) and having a kinematic viscosity at 100° C. of 2 mm$^2$/s or more and 50 mm$^2$/s or less and a hydroxyl value of 5 mgKOH/g or less.

[Base Oil]

(Polyoxyalkylene Glycol (PAG))

In the refrigerating machine oil composition of the present invention, examples of the polyoxyalkylene glycol which may be used as the base oil include compounds represented by the general formula (I):

$$R^1-[(OR^2)_m-OR^3]_n \qquad (I)$$

(in the formula, $R^1$ represents a hydrogen atom, an alkyl group having 1 to 10 carbon atoms, an acyl group having 2 to 10 carbon atoms, or an aliphatic hydrocarbon group having 1 to 10 carbon atoms and having 2 to 6 bonding sites; $R^2$ represents an alkylene group having 2 to 4 carbon atoms; $R^3$ represents a hydrogen atom, an alkyl group having 1 to 10 carbon atoms, or an acyl group having 2 to 10 carbon atoms (each of $R^1$ and $R^2$ may be a heterocyclic ring); n represents an integer of 1 to 6; and m represents such a number that an average value for m×n is from 6 to 80).

In the foregoing general formula (I), the alkyl group represented by $R^1$ or $R^3$ may be linear, branched, or cyclic. Specific examples of the alkyl group may include a methyl group, an ethyl group, an n-propyl group, an isopropyl group, various butyl groups, various pentyl groups, various hexyl groups, various heptyl groups, various octyl groups, various nonyl groups, various decyl groups, a cyclopentyl group, a cyclohexyl group, and the like. When the carbon number of this alkyl group is more than 10, the compatibility with the refrigerant is lowered, so that there may be the case where phase separation is caused. The carbon number of the alkyl group is preferably 1 to 6.

In addition, an alkyl group moiety of the acyl group represented by $R^1$ or $R^3$ may be linear, branched, or cyclic. Specific examples of the alkyl group moiety of the acyl group may include various groups having 1 to 9 carbon atoms exemplified above as the specific examples of the alkyl group. When the carbon number of the acyl group is more than 10, the compatibility with the refrigerant is lowered, so that there may be the case where phase separation is caused. The carbon number of the acyl group is preferably 2 to 6.

When $R^1$ and $R^3$ each represent an alkyl group or an acyl group, $R^1$ and $R^3$ may be identical to or different from each other.

Furthermore, when n represents 2 or more, a plurality of $R^3$'s in one molecule may be identical to or different from each other.

When $R^1$ represents an aliphatic hydrocarbon group having 1 to 10 carbon atoms and having 2 to 6 bonding sites, this aliphatic hydrocarbon group may be linear or cyclic. Examples of the aliphatic hydrocarbon group having 2 bonding sites include an ethylene group, a propylene group, a butylene group, a pentylene group, a hexylene group, a heptylene group, an octylene group, a nonylene group, a decylene group, a cyclopentylene group, a cyclohexylene group, and the like. In addition, examples of the aliphatic hydrocarbon group having 3 to 6 bonding sites may include residues each obtained by removing a hydroxyl group from a polyhydric alcohol, such as trimethylolpropane, glycerin, pentaerythritol, sorbitol, 1,2,3-trihydroxycyclohexane, 1,3,5-trihydroxycyclohexane, etc.

When the carbon number of this aliphatic hydrocarbon group is more than 10, the compatibility with the refrigerant is lowered, so that there may be the case where phase separation is caused. The carbon number is preferably 2 to 6.

In addition, each of $R^1$ and $R^3$ may be a heterocyclic ring, and the heterocyclic ring hetero atom is oxygen and/or sulfur. The heterocyclic ring preferably contains oxygen or sulfur. The heterocyclic ring may be saturated or unsaturated. For example, each of $R^1$ and $R^3$ may be a saturated cyclic ether or saturated cyclic thioether. Such a cyclic compound may or may not be substituted. When the cyclic compound is substituted, the heterocyclic ring may be connected via the substituent or a non-specified single substituent. In such a case, the substituent may be, for example, a hydrocarbon linkage that is —$CH_2$—, —$C_2H_4$—, or —$C_3H_6$—. Preferably, each of $R^1$ and $R^3$ may contain a heterocyclic ring moiety of $C_4$ to $C_6$ linked directly or via a hydrocarbon linkage.

For example, the heterocyclic ring moiety may be a furan or thiophene ring. Instead, the heterocyclic ring moiety may be furfuryl or a furfuryl derivative, such as tetrahydrofurfuryl, and may be linked directly or via a hydrocarbon linkage. Examples of original compounds from which each of $R^1$ and $R^3$ is derived include tetrahydrofuran, methyltetrahydrofuran, tetrahydrothiophene, and methyltetrahydrothiophene substituents. Preferred examples of $R^1$ and $R^3$ include groups which are derivable from 2-hydroxymethyltetrahydrofuran, and the derivable group, such as a group in which each of $R^1$ and $R^3$ is derived from methyltetrahydrofuran and bonded via oxygen, etc., may be considered to a group following the aforementioned definition.

$R^2$ in the foregoing general formula (I) represents an alkylene group having 2 to 4 carbon atoms, and examples of an oxyalkylene group as a repeating unit include an oxyethylene group, an oxypropylene group, and an oxybutylene group. The oxyalkylene groups in one molecule may be identical to each other, or may include two or more kinds of oxyalkylene groups. However, a compound containing at least an oxypropylene unit in one molecule is preferred, and in particular, a compound containing 50 mol % or more of an oxypropylene unit in the oxyalkylene unit is suitable.

n in the foregoing general formula (I) represents an integer of from 1 to 6 and is determined in accordance with the number of bonding sites of $R^1$. For example, when $R^1$ represents an alkyl group or an acyl group, n represents 1, and when $R^1$ represents an aliphatic hydrocarbon group having 2, 3, 4, 5, or 6 bonding sites, n represents 2, 3, 4, 5, or 6, respectively. In addition, m represents such a number that an average value for m×n is from 6 to 80. When the average value for m×n deviates from the foregoing range, the object of the present invention is not sufficiently achieved.

The polyoxyalkylene glycol represented by the foregoing general formula (I) includes a polyoxyalkylene glycol having a hydroxyl group at any one of its terminals, and may be suitably used even when the compound contains the hydroxyl group so long as a content of the hydroxyl group is 50 mol % or less relative to the whole of terminal groups. A content of the hydroxyl group in excess of 50 mol % is not preferred because the hygroscopicity increases, and the viscosity index is lowered.

As such polyoxyalkylene glycols, a polyoxypropylene glycol dimethyl ether represented by the general formula:

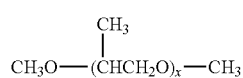

(in the formula, x represents a number of from 6 to 80), a polyoxyethylene polyoxypropylene glycol dimethyl ether represented by the general formula:

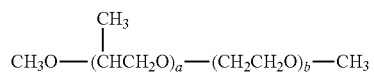

(in the formula, a and b each represent 1 or more and such a number that a total thereof is from 6 to 80), a polyoxypropylene glycol monobutyl ether represented by the general formula:

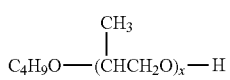

(in the formula, x represents a number of from 6 to 80), polyoxypropylene glycol diacetate, and the like are suitable from the viewpoints of economy and effects.

It should be noted that any one of those described in detail in JP 2-305893 A may be used as the polyoxyalkylene glycol represented by the foregoing general formula (I).

In the present invention, one kind of those polyoxyalkylene glycols may be used alone, or two or more kinds thereof may be used in combination.

(Polyvinyl Ether (PVE))

In the refrigerating machine oil composition of the present invention, the polyvinyl ether which may be used as the base oil is a compound including, as a main component, a polyvinyl ether-based compound having a structural unit represented by the general formula (II).

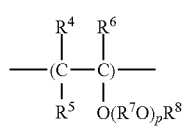

In the foregoing general formula (II), $R^4$, $R^5$, and $R^6$ each represent a hydrogen atom or a hydrocarbon group having 1 to 8 carbon atoms and may be identical to or different from each other. Specific examples of the hydrocarbon group as referred to herein include alkyl groups, such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, etc.; cycloalkyl groups, such as a cyclopentyl group, a cyclohexyl group, various methylcyclohexyl groups, various ethylcyclohexyl groups, various dimethylcyclohexyl groups, etc.; aryl groups, such as a phenyl group, various methylphenyl groups, various ethylphenyl groups, various dimethylphenyl groups, etc.; and arylalkyl groups, such as a benzyl group, various phenylethyl groups, various methylbenzyl groups, etc. It should be noted that $R^4$, $R^5$, and $R^6$ each particularly preferably represent a hydrogen atom or a hydrocarbon group having 3 or less carbon atoms.

Meanwhile, $R^7$ in the general formula (II) represents a divalent hydrocarbon group having 2 to 10 carbon atoms. Specific examples of the divalent hydrocarbon group having 2 to 10 carbon atoms as referred to herein include divalent aliphatic groups, such as an ethylene group, a phenylethylene group, a 1,2-propylene group, a 2-phenyl-1,2-propylene group, a 1,3-propylene group, various butylene groups, various pentylene groups, various hexylene groups, various heptylene groups, various octylene groups, various nonylene groups, various decylene groups, etc.; alicyclic groups in which an alicyclic hydrocarbon, such as cyclohexane, methylcyclohexane, ethylcyclohexane, dimethylcyclohexane, propylcyclohexane, etc., has two bonding sites; divalent aromatic hydrocarbon groups, such as various phenylene groups, various methylphenylene groups, various ethylphenylene groups, various dimethylphenylene groups, various naphthylene groups, etc.; alkyl aromatic groups having a monovalent bonding site in each of the alkyl group moiety and the aromatic moiety of an alkyl aromatic hydrocarbon, such as toluene, xylene, ethylbenzene, etc.; alkyl aromatic groups having a bonding site in the alkyl group moiety of a polyalkyl aromatic hydrocarbon, such as xylene, diethylbenzene, etc.; and the like. Of those, aliphatic groups having 2 to 4 carbon atoms are especially preferred. In addition, a plurality of $R^7O$'s are identical to or different from each other.

It should be noted that p in the general formula (II) represents the number of repetitions and such a number that an average value thereof falls within the range of from 0 to 10, and preferably from 0 to 5.

Furthermore, $R^8$ in the general formula (II) represents a hydrocarbon group having 1 to 10 carbon atoms. Specific examples of the hydrocarbon group as referred to herein include alkyl groups, such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, various decyl groups, etc.; cycloalkyl groups, such as a cyclopentyl group, a cyclohexyl group, various methylcyclohexyl groups, various ethylcyclohexyl groups, various propylcyclohexyl groups, various dimethylcyclohexyl groups, etc.; aryl groups, such as a phenyl group, various methylphenyl groups, various ethylphenyl groups, various dimethylphenyl groups, various propylphenyl groups, various trimethylphenyl groups, various butylphenyl groups, various naphthyl groups, etc.; and arylalkyl groups, such as a benzyl group, various phenylethyl groups, various methylbenzyl groups, various phenylpropyl groups, various phenylbutyl groups, etc. Of those, a hydrocarbon group having 8 or less carbon atoms is preferred. When p represents 0, an alkyl group having 1 to 6 carbon atoms is preferred, and when p represents 1 or more, an alkyl group having 1 to 4 carbon atoms is especially preferred.

The polyvinyl ether-based compound in the present invention has a structural unit represented by the foregoing general formula (II). The number of repetitions thereof (that is, polymerization degree) may be appropriately selected according to a desired kinematic viscosity and is typically from 2 mm$^2$/s or more and 50 mm$^2$/s or less (at 100° C.), and preferably 5 mm$^2$/s or more and 30 mm$^2$/s or less (at 100° C.).

The polyvinyl ether-based compound in the present invention may be produced by polymerization of a corresponding vinyl ether-based monomer. The vinyl ether-based monomer which may be used herein is represented by the general formula (III):

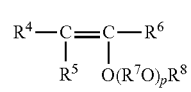

(in the formula, $R^4$, $R^5$, $R^6$, $R^7$, $R^8$, and p each have the same meaning as that described above). As this vinyl ether-based monomer, there are various compounds corresponding to the polyvinyl ether-based compound as described above. Examples thereof include vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether, vinyl n-hexyl ether, vinyl 2-methoxyethyl ether, vinyl 2-ethoxyethyl ether, vinyl 2-methoxy-1-methylethyl ether, vinyl 2-methoxypropyl ether, vinyl 3,6-dioxaheptyl ether; vinyl 3,6,9-trioxadecyl ether, vinyl 1,4-dimethyl-3,6-dioxaheptyl ether, vinyl 1,4,7-trimethyl-3,6,9-trioxadecyl ether, vinyl 2,6-dioxa-4-heptyl ether, vinyl 2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxyl-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, 2-tert-butoxy-2-butene, and the like. Those vinyl ether-based monomers may be produced by any known methods.

The terminals of the polyvinyl ether-based compound having the structural unit represented by the foregoing general formula (II) to be used in the refrigerating machine oil composition of the present invention may be converted to a desired structure by a known method. Examples of the converted group may include a saturated hydrocarbon, an ether, an alcohol, a ketone, an amide, a nitrile, and the like.

The polyvinyl ether-based compound to be used in the base oil in the refrigerating machine oil composition of the present invention suitably has the following terminal structure.

That is, the polyvinyl ether-based compound has:
(1) a structure in which one of the terminals is represented by the general formula (IV):

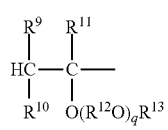

(IV)

(in the formula, $R^9$, $R^{10}$, and $R^{11}$ each represent a hydrogen atom or a hydrocarbon group having 1 to 8 carbon atoms and may be identical to or different from each other; $R^{12}$ represents a divalent hydrocarbon group having 2 to 10 carbon atoms; $R^{13}$ represents a hydrocarbon group having 1 to 10 carbon atoms; q represents such a number that an average value thereof is from 0 to 10; and when a plurality of $R^{12}O$'s are present, a plurality of $R^{12}O$'s may be identical to or different from each other), and the other terminal is represented by the general formula (V):

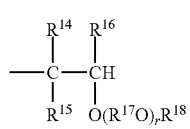

(V)

(in the formula, $R^{14}$, $R^{15}$, and $R^{16}$ each represent a hydrogen atom or a hydrocarbon group having 1 to 8 carbon atoms and may be identical to or different from each other; $R^{17}$ represents a divalent hydrocarbon group having 2 to 10 carbon atoms; $R^{18}$ represents a hydrocarbon group having 1 to 10 carbon atoms; r represents such a number that an average value thereof is from 0 to 10; and when a plurality of $R^{17}O$'s are present, a plurality of $R^{17}O$'s may be identical to or different from each other);

(2) a structure in which one of the terminals is represented by the foregoing general formula (IV), and the other terminal is represented by the general formula (VI);

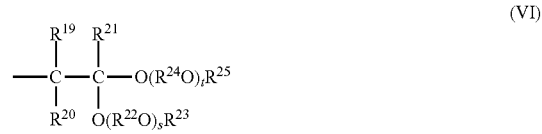

(VI)

(in the formula, $R^{19}$, $R^{20}$, and $R^{21}$ each represent a hydrogen atom or a hydrocarbon group having 1 to 8 carbon atoms and may be identical to or different from each other; $R^{22}$ and $R^{24}$ each represent a divalent hydrocarbon group having 2 to 10 carbon atoms and may be identical to or different from each other; $R^{23}$ and $R^{25}$ each represent a hydrocarbon group having 1 to 10 carbon atoms and may be identical to or different from each other; s and t each represent such a number that an average value thereof is from 0 to 10 and may be identical to or different from each other; when a plurality of $R^{22}O$'s are present, a plurality of $R^{22}O$'s may be identical to or different from each other; and when a plurality of $R^{24}$'s are present, a plurality of $R^{24}$'s may be identical to or different from each other);

(3) a structure in which one of the terminals is represented by the foregoing general formula (IV), and the other terminal has an olefinically unsaturated bond; or (4) a structure in which one of the terminals is represented by the foregoing general formula (IV), and the other terminal is represented by the general formula (VII);

(VII)

(in the formula, $R^{26}$, $R^{27}$, and $R^{28}$ each represent a hydrogen atom or a hydrocarbon group having 1 to 8 carbon atoms and may be identical to or different from each other).

The polyvinyl ether-based mixture may be a mixture including two or more kinds of polyvinyl ether-based compounds selected from those having the terminal structures as set forth in the above items (1) to (4). Preferred examples of the mixture may include a mixture of the compound as set forth in the above item (1) and the compound set forth in the above item (4) and a mixture of the compound as set forth in the above item (2) and the compound set forth in the above item (3).

As for the polyvinyl ether-based compound, the kinematic viscosity of the refrigerating machine oil composition before being mixed with the refrigerant is preferably 2 mm²/s or more and 50 mm²/s or less at 100° C. Therefore, it is preferred to select the raw material, the initiator, and the reaction conditions so as to produce a polyvinyl ether-based compound falling within this viscosity range. In addition, a number average molecular weight of this polymer is typically 500 or more, and preferably 600 or more and 3,000 or less. It should be noted that even a polymer whose kinematic viscosity falls outside the foregoing range may be adjusted so as to fall within the foregoing kinematic viscosity range by mixing with a polymer having another kinematic viscosity.

In the present invention, one kind of the polyvinyl ether-based compounds may be used alone, or two or more kinds thereof may be used in combination.

(Copolymer (ECP) of Poly(Oxy)Alkylene Glycol or Monoether Thereof and Polyvinyl Ether)

The poly(oxy)alkylene glycol as referred to herein is a concept including both a polyalkylene glycol and a polyoxyalkylene glycol.

In the refrigerating machine oil composition of the present invention, examples of the copolymer of a poly(oxy)alkylene glycol or a monoether thereof and a polyvinyl ether, which may be used as a base oil, may include copolymers represented by the general formula (VIII) and the general formula (IX) (hereinafter referred to as polyvinyl ether-based copolymer I and polyvinyl ether-based copolymer II, respectively).

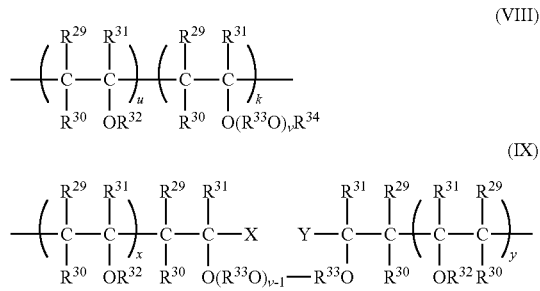

In the foregoing general formula (VIII), $R^{29}$, $R^{30}$, and $R^{31}$ each represent a hydrogen atom or a hydrocarbon group having 1 to 8 carbon atoms and may be identical to or different from each other; $R^{33}$ represents a divalent hydrocarbon group having 2 to 4 carbon atoms; $R^{34}$ represents an aliphatic or alicyclic hydrocarbon group having 1 to 20 carbon atoms, an aromatic group optionally having substituent having 1 to 20 carbon atoms, an acyl group having 2 to 20 carbon atoms, or an oxygen-containing hydrocarbon group having 2 to 50 carbon atoms; $R^{32}$ represents a hydrocarbon group having 1 to 10 carbon atoms; and when a plurality of each of $R^{32}$'s, $R^{33}$'s, and $R^{34}$'s are present, a plurality of each of $R^{32}$'s, $R^{33}$'s, and $R^{34}$'s may be identical to or different from each other.

Here, specific examples of the hydrocarbon group having 1 to 8 carbon atoms represented by each of $R^{29}$ to $R^{31}$ as referred to herein include alkyl groups, such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, etc.; cycloalkyl groups, such as a cyclopentyl group, a cyclohexyl group, various methylcyclohexyl groups, various ethylcyclohexyl groups, various dimethylcyclohexyl groups, etc.; aryl groups, such as various dimethylphenyl groups, etc.; and arylalkyl groups, such as a benzyl group, various phenylethyl groups, various methylbenzyl groups, etc. It should be noted that $R^{29}$, $R^{30}$, and $R^{31}$ each especially preferably represent a hydrogen atom.

Meanwhile, specific examples of the divalent hydrocarbon group having 2 to 4 carbon atoms represented by $R^{33}$ include divalent alkylene groups, such as a methylene group, an ethylene group, a propylene group, a trimethylene group, various butylene groups, etc.

It should be noted that v in the general formula (VIII) represents the number of repetitions of $R^{33}O$ and represents such a number that an average value thereof falls within the range of from 1 to 50, preferably from 1 to 20, more preferably from 1 to 10, and especially preferably from 1 to 5. When a plurality of $R^{33}O$'s are present, a plurality of $R^{33}O$'s are identical to or different from each other.

In addition, k represents a number of from 1 to 50, preferably from 1 to 10, more preferably from 1 to 2, and especially preferably 1; and u represents a number of from 0 to 50, preferably from 2 to 25, and more preferably from 5 to 15. When a plurality of each of k's and u's are present, each of the polymers may be a block polymer or a random polymer.

Furthermore, $R^{34}$ in the general formula (VIII) preferably represents an alkyl group having 1 to 10 carbon atoms, an acyl group having 2 to 10 carbon atoms, or an oxygen-containing hydrocarbon group having 2 to 50 carbon atoms.

Specific examples of the alkyl group having 1 to 10 carbon atoms as referred to herein include a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, various decyl groups, a cyclopentyl group, a cyclohexyl group, various methylcyclohexyl groups, various ethylcyclohexyl groups, various propylcyclohexyl groups, various dimethylcyclohexyl groups, and the like.

In addition, examples of the acyl group having 2 to 10 carbon atoms may include an acetyl group, a propionyl group, a butyryl group, an isobutyryl group, a valeryl group, an isovaleryl group, a pivaloyl group, a benzoyl group, a toluoyl group, and the like.

Furthermore, preferred specific examples of the oxygen-containing hydrocarbon group having 2 to 50 carbon atoms may include a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, a (1-methyl-2-methoxy)propyl group, and the like.

In the general formula (VIII), specific examples of the hydrocarbon group having 1 to 10 carbon atoms represented by $R^{32}$ include alkyl groups, such as a methyl group, an ethyl group, an n-propyl group, an isopropyl group, an n-butyl group, an isobutyl group, various pentyl groups, various hexyl groups, various heptyl groups, various octyl groups, various nonyl groups, various decyl groups, etc.; cycloalkyl groups, such as a cyclopentyl group, a cyclohexyl group, various methylcyclohexyl groups, various ethylcyclohexyl groups, various propylcyclohexyl groups, various dimethylcyclohexyl groups, etc.; aryl groups, such as a phenyl group, various methylphenyl groups, various ethylphenyl groups, various dimethylphenyl groups, various propylphenyl groups, various trimethylphenyl groups, various butylphenyl groups, various naphthyl groups, etc.; arylalkyl groups, such as a benzyl group, various phenylethyl groups, various methylbenzyl groups, various phenylpropyl groups, various phenylbutyl groups, etc.; and the like.

It should be noted that $R^{29}$ to $R^{31}$, $R^{31}$, $R^{33}$, v, and $R^{29}$ to $R^{32}$ may be identical to or different from each other for every structural unit.

The polyvinyl ether-based copolymer I having the structural unit represented by the foregoing general formula (VIII) has effects for improving lubricity, insulating properties, hygroscopicity, and the like while satisfying the compatibility because the polyvinyl ether-based copolymer I is a copolymer. On this occasion, those performances of the oil agent may be adjusted to the intended level by selecting the kind of the monomer as a raw material, the kind of the initiator, and the ratio of the copolymer. In consequence, the polyvinyl ether-based copolymer I has such an effect that an oil agent depending on requirements of the type of a compressor in a refrigerating system or an air conditioner system, and the lubricity, the compatibility, and the like, which are different according to the material of a lubricating part, refrigerating capacity, the kind of the refrigerant, and the like, can be obtained freely.

Meanwhile, in the polyvinyl ether-based copolymer II represented by the foregoing general formula (IX), $R^{29}$ to $R^{32}$, $R^{33}$, and v each have the same meaning as that described above. When a plurality of each of $R^{33}$'s and $R^{32}$'s are present, each of $R^{33}$'s and $R^{32}$'s may be identical to or different from each other. x and y each represent a number of from 1 to 50. When a plurality of each of x's and y's are present, each of the polymers may be a block polymer or a random polymer. X and Y each independently represent a hydrogen atom, a hydroxyl group, or a hydrocarbon group having 1 to 20 carbon atoms.

A production method of each of the polyvinyl ether-based copolymers I and II is not particularly limited so long as each of the polyvinyl ether-based copolymers I and II is obtained. For example, the polyvinyl ether-based copolymers I and II may be produced by the methods described in paragraphs [0059] to [0074] of JP 2008-115266 A.

In the present invention, one kind of the copolymers of a poly(oxy)alkylene glycol or a monoether thereof and a polyvinyl ether may be used alone, or two or more kinds thereof may be used in combination.

(Polyol Ester (POE))

An ester of a diol or a polyol having about 3 to 20 hydroxyl groups and a fatty acid having about 1 to 24 carbon atoms is preferably used as the polyol ester which may be used as the base oil in the refrigerating machine oil composition of the present invention. Here, examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, 1,12-dodecanediol, and the like.

Examples of the polyol include polyhydric alcohols, such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (dimer to icosamer of glycerin), 1,3,5-pentanetriol, sorbitol, sorbitan, a sorbitol glycerin condensate, adonitol, arabitol, xylitol, mannitol, etc.; saccharides, such as xylose, arabinose, ribose, rhamnose, glucose, fructose, galactose, mannose, sorbose, cellobiose, maltose, isomaltose, trehalose, sucrose, raffinose, gentianose, melezitose, etc.; and partially etherified products thereof; methyl glucosides (glycosides); and the like. Of those, hindered alcohols, such as neopentyl glycol, trimethylolethane, trimethylolpropane, trimethylolbutane, di-(trimethylolpropane), tri-(trimethylolpropane), pentaerythritol, di-(pentaerythritol), tri-(pentaerythritol), etc., are preferred as the polyol.

Although the fatty acid is not particularly limited in terms of the carbon number, those having 1 to 24 carbon atoms are typically used. Of the fatty acids having 1 to 24 carbon atoms, a fatty acid having 3 or more carbon atoms is preferred, a fatty acid having 4 or more carbon atoms is more preferred, a fatty acid having 5 or more carbon atoms is still more preferred, and a fatty acid having 10 or more carbon atoms is most preferred in terms of lubricity. In addition, a fatty acid having 18 or less carbon atoms is preferred, a fatty acid having 12 or less carbon atoms is more preferred, and a fatty acid having 9 or less carbon atoms is still more preferred in terms of compatibility with the refrigerant.

In addition, the fatty acid may be a linear fatty acid or a branched fatty acid. Of those, a linear fatty acid is preferred in terms of lubricity, and a branched fatty acid is preferred in terms of hydrolytic stability. Furthermore, the fatty acid may be a saturated fatty acid or an unsaturated fatty acid.

Examples of the fatty acid include linear or branched fatty acids, such as pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, oleic acid, etc.; so-called neo acids in which an α-carbon atom thereof is quaternary; and the like. More specifically, valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid, 3,5,5-trimethylhexanoic acid, and the like are preferred.

It should be noted that the polyol ester may be a partial ester in which some of the hydroxyl groups of a polyol remain without being esterified, may be a complete ester in which all of the hydroxyl groups of the polyol are esterified, or may be a mixture of a partial ester and a complete ester. Of those, a complete ester is preferred.

Of those polyol esters, an ester of a hindered alcohol, such as neopentyl glycol, trimethylolethane, trimethylolpropane, trimethylolbutane, di-(trimethylolpropane), tri-(trimethylolpropane), pentaerythritol, di-(pentaerythritol), tri-(pentaerythritol), etc., is more preferred, and an ester of neopentyl glycol, trimethylolethane, trimethylolpropane, trimethylolbutane, or pentaerythritol is still more preferred because such an ester is more excellent in terms of hydrolytic stability. An ester of pentaerythritol is most preferred because it is especially excellent in terms of compatibility with the refrigerant and hydrolytic stability.

Preferred specific examples of the polyol ester include diesters formed of neopentyl glycol and one or two or more fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; triesters formed of trimethylolethane and one or two or more fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; triesters formed of trimethylolpropane and one or two or more fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; triesters formed of trimethylolbutane and one or two or more fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and tetraesters formed of pentaerythritol and one or two or more fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid.

It should be noted that the esters with two or more fatty acids may be a mixture of two or more esters formed of one fatty acid and a polyol. An ester formed of two or more mixed fatty acids and a polyol, particularly an ester formed of mixed fatty acids and a polyol, is excellent in terms of low temperature properties and compatibility with the refrigerant.

(Formulation and Properties of Base Oil)

The kinematic viscosity at 100° C. of the base oil in the refrigerating machine oil composition of the present invention is 2 mm$^2$/s or more and 50 mm$^2$/s or less. So long as the kinematic viscosity is 2 mm$^2$/s or more, not only a satisfactory lubricating performance (load capacity resistance) is exhibited, but also sealing properties are good, whereas so long as the kinematic viscosity is 50 mm$^2$/s or less, the compatibility between the refrigerant and the refrigerating machine oil is excellent, and energy saving properties are satisfactory. From the aforementioned viewpoints, the kinematic viscosity at 100° C. of the base oil is preferably 3 mm$^2$/s or more and 40 mm$^2$/s or less, and more preferably 5 mm$^2$/s or more and 30 mm$^2$/s or less.

The kinematic viscosity at 100° C. of the base oil in the present invention may be measured by using a glass-made capillary viscometer in conformity with JIS K2283-1983.

The hydroxyl value of the base oil in the refrigerating machine oil composition of the present invention is 5 mgKOH/g or less. The case where the hydroxyl value is more than 5 mgKOH/g is not preferred because the stability of the refrigerating machine oil composition is inferior. From the aforementioned viewpoint, the hydroxyl value of the base oil is preferably 4 mgKOH/g or less, more preferably 3 mgKOH/g or less, still more preferably 2 mgKOH/g or less, and especially preferably 1.5 mgKOH/g or less.

The hydroxyl value of the base oil in the present invention may be measured in conformity with JIS K0070 by the neutralization titration method.

In addition, the number average molecular weight of the base oil is preferably 500 or more, more preferably 600 or more and 3,000 or less, and still more preferably 700 or more and 2,500 or less. A flashing point of the base oil is preferably 150° C. or higher. It should be noted that so long as the number average molecular weight of the base oil is 500 or more, not only the desired performance as the refrigerating machine oil may be exhibited, but also the flashing point of the base oil may be made to 150° C. or higher.

So long as the base oil in the refrigerating machine oil composition of the present invention has the aforementioned properties, one containing, in addition to the base oil including the aforementioned oxygen-containing compound, other base oil in a proportion of 50 mass % or less, preferably 30 mass % or less, and more preferably 10 mass % or less may be used.

Examples of the base oil which may be used together with the oxygen-containing compound may include other polyesters, polycarbonates, hydrogenated products of an α-olefin oligomer, mineral oils, alicyclic hydrocarbon compounds, alkylated aromatic hydrocarbon compounds, and the like.

[Additives]

The refrigerating machine oil composition of the present invention may contain at least one additive selected from an antioxidant, an extreme pressure agent, an acid scavenger, an oxygen scavenger, a copper inactivator, an anticorrosive, an oiliness agent, an antifoaming agent, and the like.

Examples of the extreme pressure agent may include phosphorus-based extreme pressure agents, such as phosphoric acid esters, acidic phosphoric acid esters, phosphorous acid esters, acidic phosphorous acid esters, and amine salts thereof, etc.

Of those phosphorus-based extreme pressure agents, tricresyl phosphate, trithiophenyl phosphate, tri(nonylphenyl) phosphite, dioleyl hydrogen phosphite, 2-ethylhexyl diphenyl phosphite, and the like are especially preferred from the standpoints of extreme pressure properties, friction properties, and the like.

In addition, examples of the extreme pressure agent include metal salts of a carboxylic acid. The metal salt of a carboxylic acid as referred to herein is preferably a metal salt of a carboxylic acid having 3 to 60 carbon atoms, more preferably a metal salt of a fatty acid having 3 to 30 carbon atoms, and especially preferably a metal salt of a fatty acid having 12 to 30 carbon atoms. In addition, examples thereof may include metal salts of a dimer acid or a trimer acid of the aforementioned fatty acid, and metal salts of a dicarboxylic acid having 3 to 30 carbon atoms. Of those, metal salts of a fatty acid having 12 to 30 carbon atoms and metal salts of a dicarboxylic acid having 3 to 30 carbon atoms are especially preferred.

Meanwhile, the metal constituting the metal salt is preferably an alkali metal or an alkaline earth metal, and especially optimally an alkali metal.

Furthermore, examples of the extreme pressure agents other than those mentioned above may include sulfur-based extreme pressure agents, such as sulfurized oils and fats, sulfurized fatty acids, sulfurized esters, sulfurized olefins, dihydrocarbyl polysulfide, thiocarbamates, thioterpenes, dialkyl thiodipropionates, and the like.

A blending amount of the extreme pressure agent is typically 0.001 mass % or more and 5 mass % or less, and especially preferably 0.005 mass % or more and 3 mass % or less based on the total amount of the composition from the standpoints of lubricity and stability.

One kind of the extreme pressure agents may be used alone, or two or more kinds thereof may be used in combination.

A phenol-based antioxidant, such as 2,6-di-tert-butyl-4-methylphenol, 2,6-di-tert-butyl-4-ethylphenol, 2,2'-methylenebis(4-methyl-6-tert-butylphenol), etc., or an amine-based antioxidant, such as phenyl-α-naphthylamine, N,N'-di-phenyl-p-phenylenediamine, etc., is preferably blended as the antioxidant. The antioxidant is blended in an amount of typically 0.01 mass % or more and 5 mass % or less, and preferably 0.05 mass % or more and 3 mass % or less in the composition from the standpoints of effects, economy, and the like.

Examples of the acid scavenger may include phenyl glycidyl ether, an alkyl glycidyl ether, an alkylene glycol glycidyl ether, cyclohexene oxide, an α-olefin oxide, and an epoxy compound, such as epoxidized soybean oil, etc. Of those, phenyl glycidyl ether, an alkyl glycidyl ether, an alkylene glycol glycidyl ether, cyclohexene oxide, and an α-olefin oxide are preferred from the standpoint of compatibility.

Each of an alkyl group of the alkyl glycidyl ether and an alkylene group of the alkylene glycol glycidyl ether may be branched, and the carbon number thereof is typically 3 to 30, preferably 4 to 24, and especially preferably 6 to 16. In addition, one having a total carbon number of generally 4 to 50, preferably 4 to 24, and especially preferably 6 to 16 is used as the α-olefin oxide. In the present invention, one kind of the acid scavengers may be used, or two or more kinds thereof may be used in combination. In addition, a blending amount thereof is typically 0.005 mass % or more and 5 mass % or less, and especially preferably 0.05 mass % or more and 3 mass % or less relative to the composition from the standpoints of effects and suppression of the generation of sludge.

In the present invention, the stability of the refrigerating machine oil composition may be improved by blending this acid scavenger. In addition, a combined use of the extreme pressure agent and the antioxidant with the acid scavenger exhibits an effect for more improving the stability.

Examples of the oxygen scavenger may include phenyl glycidyl ether, an alkyl glycidyl ether, an alkylene glycol glycidyl ether, cyclohexene oxide, an α-olefin oxide, an epoxy compound, such as epoxidized soybean oil, etc., and the like.

Examples of the copper inactivator may include an N—[N,N'-dialkyl (alkyl group having 3 to 12 carbon atoms) aminomethyl]triazole and the like.

Examples of the anticorrosive may include a metal sulfonate, an aliphatic amine, an organic phosphorous acid ester, an organic phosphoric acid ester, an organic sulfonic acid metal salt, an organic phosphoric acid metal salt, an alkenyl succinic acid ester, a polyhydric alcohol ester, and the like.

Examples of the oiliness agent may include aliphatic saturated (and unsaturated) monocarboxylic acids, such as stearic acid, oleic acid, etc.; polymerized fatty acids, such as dimer acids, hydrogenated dimer acids, etc.; hydroxy fatty acids, such as ricinoleic acid, 12-hydroxystearic acid, etc.; aliphatic saturated (and unsaturated) monohydric alcohols, such as lauryl alcohol, oleyl alcohol, etc.; aliphatic saturated (and unsaturated) monoamines, such as stearylamine, oleylamine, etc.; aliphatic saturated (and unsaturated) monocarboxylic acid amides, such as lauric acid amide, oleic acid amide, etc.; partial esters of a polyhydric alcohol, such as glycerin, sorbitol, etc., and an aliphatic saturated (or unsaturated) monocarboxylic acid; and the like.

Examples of the antifoaming agent may include a silicone oil, a fluorinated silicone oil, and the like.

In the refrigerating machine oil composition of the present invention, any other known various additives may be blended so long as the object of the present invention is not inhibited.

As described previously, the refrigerating machine oil composition of the present invention is used as a combination with a refrigerant including a mixture of an unsaturated fluorinated hydrocarbon compound, a saturated fluorinated hydrocarbon compound, and $CO_2$. In this case, a moisture content in the refrigerating machine oil composition is preferably 700 mass ppm or less, more preferably 500 mass ppm or less, still more preferably 300 mass ppm or less, yet still more preferably 200 mass ppm or less, and most preferably 100 mass ppm or less. So long as the moisture content in the refrigerating machine oil composition falls within the foregoing range, the composition is excellent in terms of stability, and hence, such is preferred.

<Refrigerating Machine System>

The refrigerating machine oil composition of the present invention is applied to a refrigerating machine system using a refrigerant including a mixture of an unsaturated fluorinated hydrocarbon compound, a saturated fluorinated hydrocarbon compound, and $CO_2$.

In a lubricating method in the refrigerating machine system using the refrigerating machine oil composition of the present invention, a use amount of the refrigerant and the refrigerating machine oil composition is in the range of preferably from 99/1 to 10/90, and more preferably from 95/5 to 30/70 in terms of a mass ratio of the refrigerant to the refrigerating machine oil composition (the refrigerant/the refrigerating machine oil composition). The case where the amount of the refrigerant is less than the foregoing range is not preferred because a lowering in the refrigerating capacity is observed, whereas the case where the amount of the refrigerant is more than the foregoing range is not preferred because the lubricating performance is lowered. Although the refrigerating machine oil composition of the present invention may be used in various refrigerating machines, in particular, it is preferably applicable to the compression type refrigerating cycle of a compression type refrigerating machine.

The refrigerating machine oil composition of the present invention may be used in various refrigerating machine or heating machine systems, for example, a car air conditioner, an electrically-driven car air conditioner, a gas heat pump (GHP), an air conditioner, a cold storage, a vending machine, a showcase, a hot water supply system, a floor heating system, or the like.

In the present invention, when used in the refrigerating machine system, the moisture content within the system is made to 500 mass ppm or less. When the moisture content within the system is more than 500 mass ppm, the stability of the refrigerating machine oil composition becomes deteriorated, resulting in causing corrosion of the members constituting the interior of the system or generation of copper plating. The moisture content is preferably 300 mass ppm or less, more preferably 200 mass ppm or less, and still more preferably 100 mass ppm or less.

EXAMPLES

The present invention is hereunder more specifically described by way of Examples, but it should be construed that the present invention is not limited by these Examples at all.

It should be noted that properties of base oils and various properties of refrigerating machine oil compositions were determined in accordance with the following methods.

<Properties of Base Oil>

(1) Kinematic Viscosity (at 40° C. and 100° C.)

A kinematic viscosity was measured with a glass-made capillary viscometer in conformity with JIS K2283-1983.

(2) Hydroxyl Value

A hydroxyl value was measured in conformity with JIS K0070 by the neutralization titration method.

(3) Acid Value

An acid value was measured in conformity with JIS K2501 by the indicator-photometric titration method (see Annex 1 of the JIS standard).

(4) Moisture Content

A moisture content in the refrigerating machine oil composition was measured in conformity with JIS K2275 by the Karl Fischer titration method. In addition, the moisture content within the refrigerating machine system was measured in conformity with JIS K2275 by the Karl Fischer titration method as well by extracting the refrigerating machine oil composition from the inside of the system.

<Various Properties of Refrigerating Machine Oil Composition>

(5) Two-Layer Separation Temperature

A two-layer separation temperature measuring tube (internal volume: 10 mL) was filled with an oil (0.3 g) and a refrigerant (2.7 g) and kept in a thermostat. The temperature in the thermostat was increased from room temperature (25° C.) at a rate of 1° C./min, thereby measuring a two-layer separation temperature.

(6) Stability (Sealed Tube Test and Moisture-Mixing Sealed Tube Test)

A glass tube was filled with an oil (4 mL) and a refrigerant (1 g), and metal catalysts of iron (Fe), copper (Cu), and aluminum (Al), and sealed. After keeping the glass tube under a condition at a temperature of 175° C. for 30 days, oil appearance and Fe catalyst appearance were visually observed, and an acid value was also measured.

In addition, a moisture-mixing sealed tube test was carried out by undergoing the sealed tube test in the same manner as that described above by adding a prescribed amount of moisture to an oil by means of a micro syringe and changing the moisture content within the range of from 50 to 2,000 mass ppm as shown in Table 2.

In addition, the kinds of respective components used in the preparation of a refrigerating machine oil composition are shown below.

(1) Base Oil

A1: Polypropylene glycol dimethyl ether, kinematic viscosity at 40° C.: 42.8 mm$^2$/s, kinematic viscosity at 100° C.: 9.52 mm$^2$/s, hydroxyl value (OHV): 0.9 mgKOH/g A2: Polypropylene glycol dimethyl ether, kinematic viscosity at 40° C.: 43.5 mm$^2$/s, kinematic viscosity at 100° C.: 9.34 mm$^2$/s, hydroxyl value (OHV): 3.5 mgKOH/g A3: Polyoxypropylene/polyoxyethylene copolymer dimethyl ether (PO/EO molar ratio: 7/3), kinematic viscosity at 40° C.: 43.1 mm$^2$/s, kinematic viscosity at 100° C.: 10.3 mm$^2$/s, hydroxyl value (OHV): 1.2 mgKOH/g A4: Polyethyl vinyl ether, kinematic viscosity at 40° C.: 68.5 mm$^2$/s, kinematic viscosity at 100° C.: 8.39 mm$^2$/s, hydroxyl value (OHV): 1.1 mgKOH/g A5: Polyethyl vinyl ether/polybutyl vinyl ether copolymer (molar ratio: 9/1), kinematic viscosity at 40° C.: 69.7 mm$^2$/s, kinematic viscosity at 100° C.: 8.51 mm$^2$/s, hydroxyl value (OHV): 1.5 mgKOH/g A6: Ester of pentaerythritol, 2-ethylhexanoic acid, and 3,5,5-trimethylhexanoic acid (2-ethylhexanoic acid/3,5,5-trimethylhexanoic acid: 1/1 (molar ratio)), kinematic viscosity at 40° C.: 68.5 mm$^2$/s, kinematic viscosity at 100° C.: 8.32 mm$^2$/s, hydroxyl value (OHV): 3.2 mgKOH/g A7: Polypropylene glycol dimethyl ether, kinematic viscosity at 40° C.: 44.56 mm$^2$/s, kinematic viscosity at 100° C.: 9.13 mm$^2$/s, hydroxyl value (OHV): 6.7 mgKOH/g A8: Ester of pentaerythritol, 2-ethylhexanoic acid, and 3,5,5-trimethylhexanoic acid (2-ethylhexanoic acid/3,5,5-trimethylhexanoic acid: 1/1 (molar ratio)), kinematic viscosity at 40° C.: 70.3 mm$^2$/s, kinematic viscosity at 100° C.: 8.27 mm$^2$/s, hydroxyl value (OHV): 8.6 mgKOH/g A9: Polypropylene glycol dimethyl ether, kinematic viscosity at 40° C.: 148.3 mm$^2$/s, kinematic viscosity at 100° C.: 27.34 mm$^2$/s, hydroxyl value (OHV): 2.7 mgKOH/g A10: Polypropylene glycol dimethyl ether, kinematic viscosity at 40° C.: 370.6 mm$^2$/s, kinematic viscosity at 100° C.: 53.8 mm$^2$/s, hydroxyl value (OHV): 3.9 mgKOH/g (2) Additives B1 (Acid scavenger): C14-α-Olefin oxide B2 (Antioxidant): 2,6-Di-t-butyl-4-methylphenol (DBPC)

B3 (Extreme pressure agent): Tricresyl phosphate (TCP)

(3) In addition, the refrigerant used was AC6A [a mixed refrigerant of R1234ze (HFO1234ze)/R134a (HFC134a)/$CO_2$: 83.73/10.56/5.71 (mass ratio), GWP: 147].

Examples 1 to 11 and Comparative Examples 1 to 3

Refrigerating machine oil compositions each having a formulation shown in Table 1 were prepared, and by using the AC6A refrigerant, the compatibility between the refrigerating machine oil composition and the AC6A refrigerant and the stability of the refrigerating machine oil composition were evaluated. The results are shown in Table 1. It should be noted that the blending amounts of the respective components are shown in terms of mass %.

TABLE 1

| | | Example 1 | Example 2 | Example 3 | Example 4 | Example 5 | Example 6 | Example 7 | Example 8 |
|---|---|---|---|---|---|---|---|---|---|
| Refrigerating machine oil (mass %) | | | | | | | | | |
| Base oil | A1 | 98.5 | — | — | — | — | — | — | 94.5 |
| | A2 | — | 98.5 | — | — | — | — | — | — |
| | A3 | — | — | 98.5 | — | — | — | — | — |
| | A4 | — | — | — | 98.5 | — | — | — | — |
| | A5 | — | — | — | — | 98.5 | — | — | — |
| | A6 | — | — | — | — | — | 98.5 | — | — |
| | A7 | — | — | — | — | — | — | — | — |
| | A8 | — | — | — | — | — | — | — | — |
| | A9 | — | — | — | — | — | — | 98.5 | — |
| | A10 | — | — | — | — | — | — | — | — |
| | Kinetic viscosity (at 100° C.) (mm$^2$/g) | 9.52 | 9.34 | 10.3 | 8.39 | 8.51 | 8.32 | 27.34 | 9.52 |
| | Hydroxyl value (mgKOH/g) | 0.9 | 3.5 | 1.2 | 1.1 | 1.5 | 3.2 | 2.7 | 0.9 |
| Additive | B1 | 1 | 1 | 1 | 1 | 1 | 1 | 1 | 5 |
| | B2 | 0.5 | 0.5 | 0.5 | 0.5 | 0.5 | 0.5 | 0.5 | 0.5 |
| Compatibility | Two-layer separation temperature (oil content ratio: 10%, ° C.) | 50< | 50< | 50< | 50< | 50< | 50< | 34 | 50< |
| Stability | Results of sealed tube test (oil appearance) | Good | Good | Good | Good | Good | Good | Good | Good |
| | Results of sealed tube test (acid value [mgKOH/g]) | 0.1 | 0.2 | 0.1 | 0.1 | 0.1 | 0.3 | 0.1 | 0.1 |

TABLE 1-continued

|  |  | Example 9 | Example 10 | Example 11 | Comparative Example 1 | Comparative Example 2 | Comparative Example 3 |
|---|---|---|---|---|---|---|---|
| Refrigerating machine oil (mass %) | | | | | | | |
| Base oil | A1 | 97.5 | 99 | 99.3 | — | — | — |
| | A2 | — | — | — | — | — | — |
| | A3 | — | — | — | — | — | — |
| | A4 | — | — | — | — | — | — |
| | A5 | — | — | — | — | — | — |
| | A6 | — | — | — | — | — | — |
| | A7 | — | — | — | — | 98.5 | — |
| | A8 | — | — | — | — | — | 98.5 |
| | A9 | — | — | — | — | — | — |
| | A10 | — | — | — | 98.5 | — | — |
| | Kinetic viscosity (at 100° C.) (mm$^2$/g) | 9.52 | 9.52 | 9.52 | 53.8 | 9.13 | 8.27 |
| | Hydroxyl value (mgKOH/g) | 0.9 | 0.9 | 0.9 | 3.9 | 6.7 | 8.6 |
| Additive | B1 | 2 | 0.5 | 0.2 | 1 | 1 | 1 |
| | B2 | 0.5 | 0.5 | 0.5 | 0.5 | 0.5 | 0.5 |
| Compatibility | Two-layer separation temperature (oil content ratio: 10%, ° C.) | 50< | 50< | 50< | Separated | 50< | 50< |
| Stability | Results of sealed tube test (oil appearance) | Good | Good | Substantially good | Good | Yellow | Brown |
| | Results of sealed tube test (acid value [mgKOH/g]) | 0.1 | 0.3 | 0.4 | 0.1 | 0.7 | 1.6 |

As noted from Table 1, in the refrigerating machine oil compositions of the present invention (Examples 1 to 11), the two-layer separation temperature exceeds 30° C. or 50° C. relative to all of the various refrigerating machine oils, and the stability in the sealed tube test is excellent. On the other hand, the results were revealed such that in Comparative Example 1, the refrigerating machine oil composition was separated from the refrigerant at room temperature; and that in Comparative Examples 2 and 3, though the two-layer separation temperature exceeded 50° C., the stability in the sealed tube test was inferior.

Examples 12 to 15 and Comparative Examples 4 and 5

Refrigerating machine oil compositions each having a formulation shown in Table 2 were prepared, and the moisture content in each of the refrigerating machine oil compositions was changed as shown in Table 2, thereby evaluating the stability of each of the refrigerating machine oil compositions. The results are shown in Table 2.

As noted from Table 2, in accordance with the refrigerating machine oil composition of the present invention, the results of the sealed tube test in Examples 12 to 15 in which the moisture content is 500 ppm or less reveal that the stability is excellent. On the other hand, the results of the sealed tube test in Comparative Examples 4 and 5 in which the moisture content exceeds 700 ppm reveal that the stability is conspicuously inferior.

INDUSTRIAL APPLICABILITY

The refrigerating machine lubricant oil composition of the present invention is suitably used for a refrigerating machine system using a refrigerant having a low global warming potential and usable especially for a car air conditioner or the like, the refrigerant including a mixture of an unsaturated fluorinated hydrocarbon compound, a saturated fluorinated hydrocarbon compound, and $CO_2$.

The invention claimed is:
1. A composition, comprising:
a refrigerating machine oil and a refrigerant,
wherein the refrigerating machine oil contains a base oil which includes at least one selected from a polyoxy-

TABLE 2

|  |  |  | Example 12 | Example 13 | Example 14 | Example 15 | Comparative Example 4 | Comparative Example 5 |
|---|---|---|---|---|---|---|---|---|
| Refrigerating machine oil (mass %) | Base oil | A1 | 98.5 | 98.5 | 98.5 | 98.5 | 98.5 | 98.5 |
| | | B1 | 1 | 1 | 1 | 1 | 1 | 1 |
| | Additive | B2 | 0.5 | 0.5 | 0.5 | 0.5 | 0.5 | 0.5 |
| | | B3 | 1 | 1 | 1 | 1 | 1 | 1 |
| | | | Moisture-mixing sealed tube test | | | | | |
| Moisture content (mass ppm) | | | 50 | 100 | 200 | 500 | 1000 | 2000 |
| Results of moisture-mixing sealed tube test (oil appearance) | | | Good | Good | Good | Pale yellow | Yellow | Brown |
| Results of moisture-mixing sealed tube test (acid value [mgKOH/g]) | | | 0.1 | 0.1 | 0.2 | 0.5 | 1.1 | 2.4 |
| Results of moisture-mixing sealed tube test (Fe catalyst appearance) | | | Good | Good | Good | Good | Cu plated | Cu plated | alkylene glycol, a polyvinyl ether, a copolymer of a poly(oxy)alkylene glycol or a monoether thereof and a polyvinyl ether, and a polyol ester and which has a kinematic viscosity at 100° C. of 2 mm²/s or more and 50 mm²/s or less and a hydroxyl value of 5 mgKOH/g or less, and wherein the refrigerant consists of 45 mass % or more of an unsaturated fluorinated hydrocarbon compound, 2-50 mass % of a saturated fluorinated hydrocarbon compound, and 1-10 mass % of $CO_2$, based on a total amount of the refrigerant.

2. The composition according to claim 1, wherein the kinematic viscosity at 100° C. of the base oil is 5 mm²/s or more and 30 mm²/s or less, and a moisture content in the composition is 700 mass ppm or less.

3. The composition according to claim 1, wherein the base oil comprises a polyoxyalkylene glycol represented by the general formula (I):

(I)

wherein, $R^1$ represents a hydrogen atom, an alkyl group having 1 to 10 carbon atoms, an acyl group having 2 to 10 carbon atoms, or an aliphatic hydrocarbon group having 1 to 10 carbon atoms and having 2 to 6 bonding sites; $R^2$ represents an alkylene group having 2 to 4 carbon atoms; $R^3$ represents a hydrogen atom, an alkyl group having 1 to 10 carbon atoms, or an acyl group having 2 to 10 carbon atoms; n represents an integer of 1 to 6; and m represents such a number that an average value for m×n is from 6 to 80.

4. The composition according to claim 1, wherein the base oil comprises a polyvinyl ether represented by the general formula (II):

(II)

wherein, $R^4$, $R^5$, and $R^6$ each represent a hydrogen atom or a hydrocarbon group having 1 to 8 carbon atoms and may be identical to or different from each other; $R^7$ represents a divalent hydrocarbon group having 2 to 10 carbon atoms; $R^8$ represents a hydrocarbon group having 1 to 10 carbon atoms; p represents such a number that an average value thereof is from 0 to 10; and when a plurality of $R^7O$'s are present, a plurality of $R^7O$'s may be identical to or different from each other.

5. The composition according to claim 1, wherein the base oil comprises a copolymer of a poly(oxy)alkylene glycol or a monoether thereof and a polyvinyl ether is represented by the general formula (VIII) or (IX):

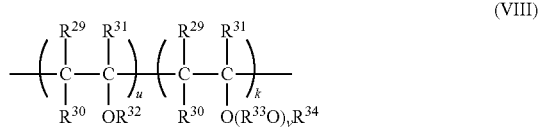
(VIII)

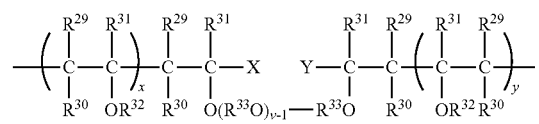
(IX)

wherein, $R^{29}$, $R^{30}$, and $R^{31}$ each represent a hydrogen atom or a hydrocarbon group having 1 to 8 carbon atoms and may be identical to or different from each other; $R^{33}$ represents a divalent hydrocarbon group having 2 to 4 carbon atoms; $R^{34}$ represents an aliphatic or alicyclic hydrocarbon group having 1 to 20 carbon atoms, an aromatic group optionally having substituent having 1 to 20 carbon atoms, an acyl group having 2 to 20 carbon atoms, or an oxygen-containing hydrocarbon group having 2 to 50 carbon atoms; $R^{32}$ represents a hydrocarbon group having 1 to 10 carbon atoms; when a plurality of each of $R^{32}$'s, $R^{33}$'s, and $R^{34}$'s are present, a plurality of each of $R^{32}$'s, $R^{33}$'s, and $R^{34}$'s may be identical to or different from each other; v represents such a number that an average value thereof falls within the range of from 1 to 50; when a plurality of $R^{33}O$'s are present, a plurality of $R^{33}O$'s may be identical to or different from each other; k represents a number of from 1 to 50; u represents a number of from 0 to 50; when a plurality of each of k's and u's are present, each of the polymers may be a block polymer or a random polymer; x and y each represent a number of from 1 to 50; when a plurality of each of x's and y's are present, each of the polymers may be a block polymer or a random polymer; and X and Y each represent a hydrogen atom a hydroxyl group, or a hydrocarbon group having 1 to 20 carbon atoms.

6. The composition according to claim 1, wherein the base oil comprises an ester of a diol or a polyol having 3 to 20 hydroxyl groups and a fatty acid having 1 to 24 carbon atoms.

7. The composition according to claim 1, wherein at least one selected from the group consisting of an antioxidant, an extreme pressure agent, an acid scavenger, an oxygen scavenger, a copper inactivator, an anticorrosive, an oiliness agent, and an antifoaming agent is blended in the base oil.

8. The composition according to claim 1, wherein a global warming potential (GWP) of the refrigerant is 150 or less.

9. The composition according to claim 1, wherein the refrigerant is a mixture of trans-1,3,3,3-tetrafluoropropene (R1234ze), 1,1,1,2-tetrafluoroethane (R134a), and $CO_2$.

10. The composition according to claim 1, wherein a moisture content of the composition is 300 mass ppm or less.

11. A refrigerating machine system using the composition according to claim 1, wherein a moisture content within the refrigerating machine system is 500 mass ppm or less.

12. The refrigerating machine system according to claim 11, which is used in a car air conditioner, a gas heat pump, an air conditioner, a cold storage, a vending machine, a showcase, a hot water supply system, or a floor heating system.

13. The composition according to claim 1, wherein the $CO_2$ is present in an amount of from 2 to 7 mass % based on the total amount of the refrigerant.

14. The composition according to claim 1, wherein the base oil comprises one or more selected from the group consisting of polypropylene glycol dimethyl ether, polyoxypropylene/polyoxyethylene copolymer dimethyl ether, polyethyl vinyl ether, polyethyl vinyl ether/polybutyl vinyl ether copolymer and an ester of pentaerythritol, 2-ethylhexanoic acid, and 3,5,5-trimethylhexanoic acid.

15. The composition according to claim 1, wherein the base oil is selected from the group consisting of polypropylene glycol dimethyl ether, polyoxypropylene/polyoxyethylene copolymer dimethyl ether, polyethyl vinyl ether, polyethyl vinyl ether/polybutyl vinyl ether copolymer and an ester of pentaerythritol, 2-ethylhexanoic acid, and 3,5,5-trimethylhexanoic acid.

16. The composition according to claim 1, wherein the base oil has a hydroxyl value of 4 mgKOH/g or less.

17. The composition according to claim 1, wherein the base oil has a hydroxyl value of 1.5 mgKOH/g or less.

18. The composition according to claim 1, wherein the unsaturated fluorinated hydrocarbon compound is present in the refrigerant in a major amount based on the total weight of the refrigerant, and the base oil has a kinematic viscosity of 2-10.3 mm$^2$/s.

\* \* \* \* \*